United States Patent [19]
Tanguay

[11] Patent Number: 5,823,585
[45] Date of Patent: Oct. 20, 1998

[54] SPORTS TRUCK STORAGE BUMPER SET

[76] Inventor: Richard R. Tanguay, 39 Elm St., Box 137, Sabattus, Me. 04280

[21] Appl. No.: 751,748

[22] Filed: Nov. 18, 1996

[51] Int. Cl.⁶ .................................................. B60R 19/02
[52] U.S. Cl. .......................................... 293/106; 296/37.6
[58] Field of Search ............................ 296/37.6; 293/106

[56] References Cited

U.S. PATENT DOCUMENTS

| | | | |
|---|---|---|---|
| 2,993,721 | 7/1961 | Bowman | 293/69 |
| 3,471,070 | 10/1969 | Olson | 224/42.04 |
| 3,614,136 | 10/1971 | Dent | 280/500 |
| 4,138,152 | 2/1979 | Prue | 293/117 |
| 4,419,038 | 12/1983 | Pendergraft | 414/543 |
| 4,570,986 | 2/1986 | Sams | 293/117 |
| 4,674,782 | 6/1987 | Helber | 296/106 |
| 4,893,856 | 1/1990 | Council | 293/106 |
| 4,961,604 | 10/1990 | Kisner | 293/106 |
| 4,993,610 | 2/1991 | Abretske et al. | 224/42.004 |
| 5,016,932 | 5/1991 | Carter | 293/106 |
| 5,135,274 | 8/1992 | Dodd | 293/117 |
| 5,364,142 | 11/1994 | Coiner | 293/117 |

Primary Examiner—Gary C. Hoge
Attorney, Agent, or Firm—Chris A. Caseiro; Thomas L. Bohan

[57] ABSTRACT

A sport utility vehicle storage bumper for the rear and the front of the vehicle. The bumper may be mounted to the front or to the rear of the frame of the vehicle. A floor plate or a diamond step plate is hingedly mounted to the storage compartment of the device for convenient opening and closing. The storage chamber is preferably designed with the storage compartments sweeping back at an angle of approximately 45° from the center of the vehicle toward the sides so as to reduce the profile of the vehicle and to minimize the possibility of unnecessarily bumping the storage chamber when moving the vehicle. The closeable lid includes one or more locks for locking one or more chambers of the storage unit. When applied to the front of the vehicle, the storage bumper is designed to accommodate a winch and a chain, in addition to other desirable equipment. When applied to the rear of the vehicle, the storage bumper has sufficient room for storage of a jack, a tow ball, and first aid equipment. Alternatively, an outwardly extending plate of the device is designed to accommodate a tow ball.

10 Claims, 5 Drawing Sheets

SPORTS TRUCK STORAGE BUMPER SET

BACKGROUND OF THE INVENTION

1. Field of the Invention

The invention relates to a bumper set for sport utility vehicles, particularly including, but not limited to off-road vehicles such as four-wheel drive trucks and the like. More particularly, the present invention relates to a bumper for a rear of such a vehicle, and a bumper for the front of such a vehicle, where the bumper includes accessible storage compartments for securely stowing equipment out of the weather and out of sight.

2. Description of the Prior Art

The application of bumpers to vehicles has been a long-standing industry practice. While in the past bumpers clearly served the function of reducing the damage caused by impact of the vehicle with another object, relatively recent movement to non-metallic bumpers and reduced-strength bumpers has rendered them more ornamental than functional. Nevertheless, they continue to serve some protective function at very low-speed impact. Unfortunately, they do little else than provide some minimal protection and make the vehicle look nice. Given their slight protective value, it is not unusual to see many trucks without rear bumpers, as the bed of the truck tends to be relied upon for safety.

In order to provide a more desirable bumper, several devices have been developed to make use of that component of the vehicle. In particular, the idea of storing equipment, etc., within an accessible bumper component has been contemplated. U.S. Pat. Nos. 5,364,142, 4,674,782, and 3,614,136 issued to Coiner, Helber, and Dent, respectively, describe such devices. That is, they each show variations on the introduction of a bumper having an interior storage section or sections that may be enclosed by means of a lid. The units described tend to be larger than a conventional bumper. In addition, they are not particularly pleasing aesthetically. They are also not designed for weather-tightness in that they fail to describe means for evacuating water. Finally, they produce a significant extension to the length of the vehicle. That extension is not readily visible to the driver of the vehicle. As a result, the prior devices described in the noted patents may well cause an increase in undesirable impacts by the nature of the low-profile extensions that they produce.

Therefore, what is needed is a storage bumper that may be used on the rear and the front of a vehicle, or a set of storage bumpers, one for the front of the vehicle and one for the rear. What is also needed is such a bumper or bumpers that is aesthetically pleasing, that provides an adequate amount of storage space, that can easily be accessed with minimal impact on use of the vehicle. Finally, what is needed is such a storage bumper or storage bumper set that is of minimal surface profile so as to reduce the possibility of undesirable impacts.

SUMMARY OF THE INVENTION

It is an object of the present invention to provide a storage bumper that may be used on the rear and the front of a vehicle, or a set of storage bumpers, one for the front of the vehicle and one for the rear. It is also an object of the present invention to provide a bumper or bumpers that is aesthetically pleasing, that provides an adequate amount of storage space, that can easily be accessed with minimal impact on use of the vehicle. Another object of the present invention is to provide a storage bumper or storage bumper set that is of minimal surface profile so as to reduce the possibility of undesirable impacts.

These and other objectives are achieved in the present invention through the introduction of a "swept-back" bumper design. The bumper of the present invention is also designed using materials and configurations that produce a strong, stable structure that is safe, useful, and appealing to the public. In addition, a lockable storage space is provided for various uses while still adding safety and protection to the occupants and the vehicle. This is achieved while maintaining a distinctive aerodynamic look to the vehicle that actually reduces the likelihood that impacts will occur. All front and side bottom corners are preferably swept back approximately 45°, both front and rear bumpers are angled upwardly approximately 35° from the center area.

In addition to having the desirable aerodynamic appearance that minimizes surface profile, this arrangement provides for drainage of the storage compartment via one or more drain holes. The prior-art devices apparently fail to teach this desirable arrangement that reduces the likelihood of long-term damage to the storage compartment and/or to equipment therein. An additional advantage in providing the upsweeping at the underside of the novel storage bumper of the present invention is that it gives vehicle clearance so as to prevent or minimize the possibility that the bumper will "hang-up" when in rough terrain.

These and other advantages of the present invention will become apparent upon review of the following detailed description, the accompanying drawings, and the appended claims.

DETAILED DESCRIPTION OF THE PREFERRED EMBODIMENT

Figure 1:
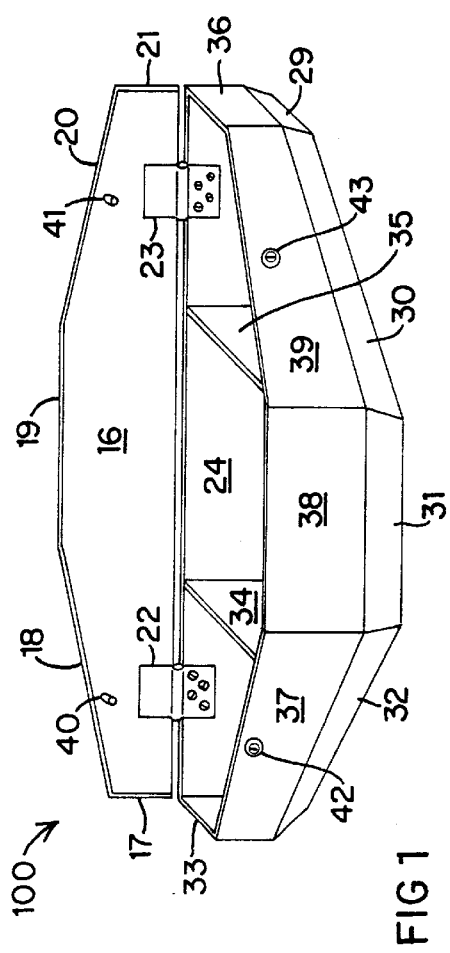
FIG. 1 shows a front view of the front bumper of the present invention, with step lid open.
Figure 2:
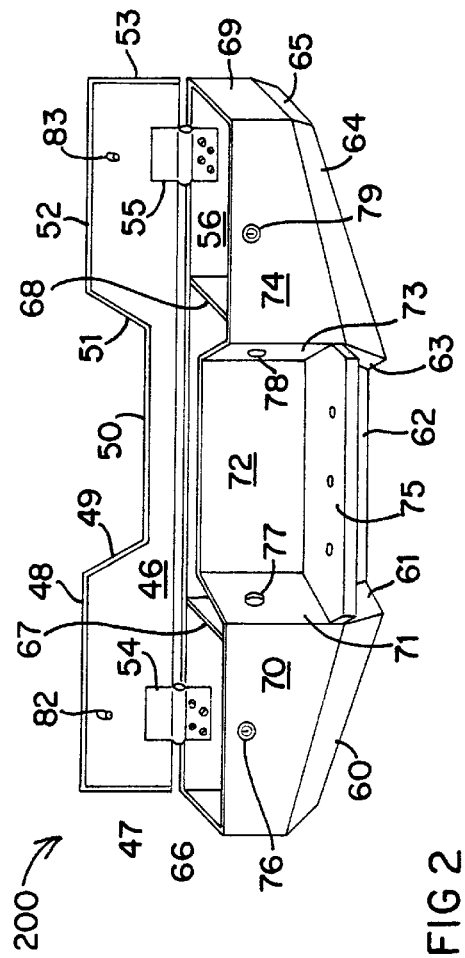
FIG. 2 shows a front view of the rear bumper of the present invention, with step lid open.
Figure 3:
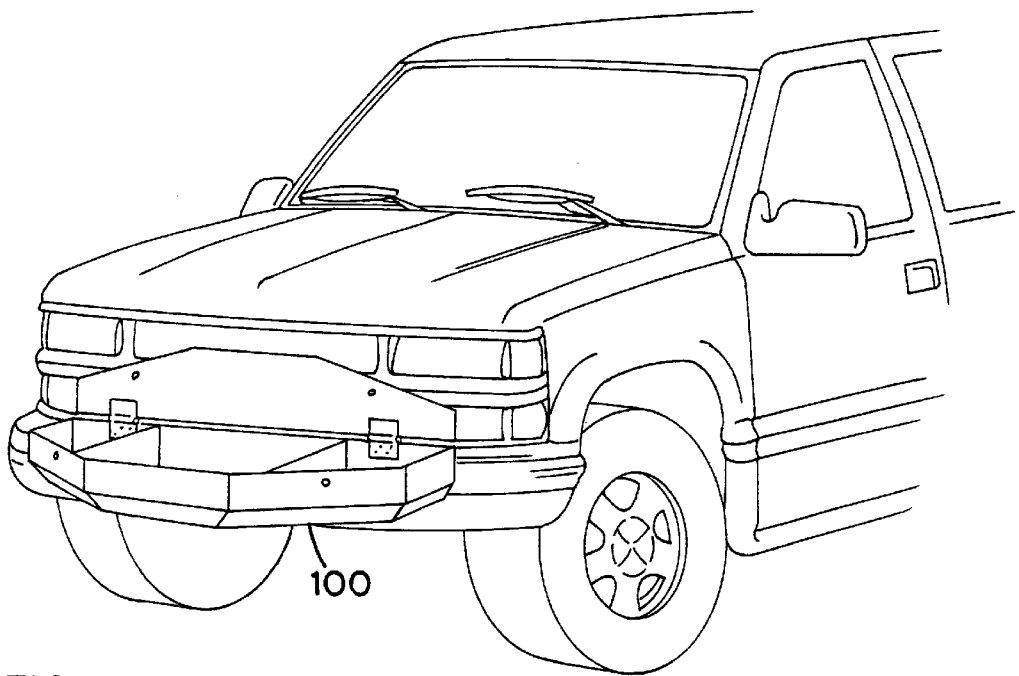
FIG. 3 shows a perspective view of the front bumper of the present invention as applied to a vehicle.
Figure 4:
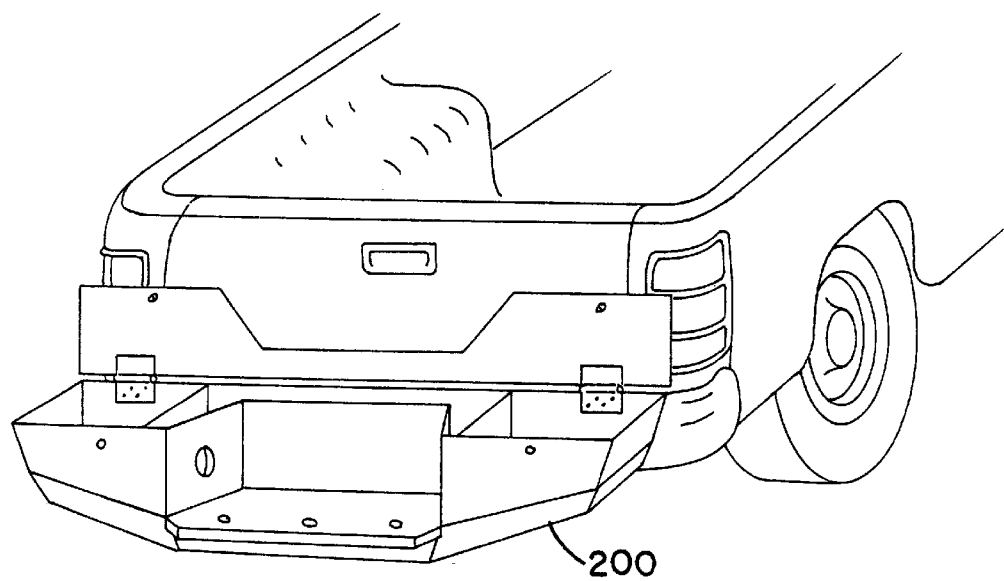
FIG. 4 shows a perspective view of the rear bumper of the present invention as applied to a vehicle.
Figure 5:
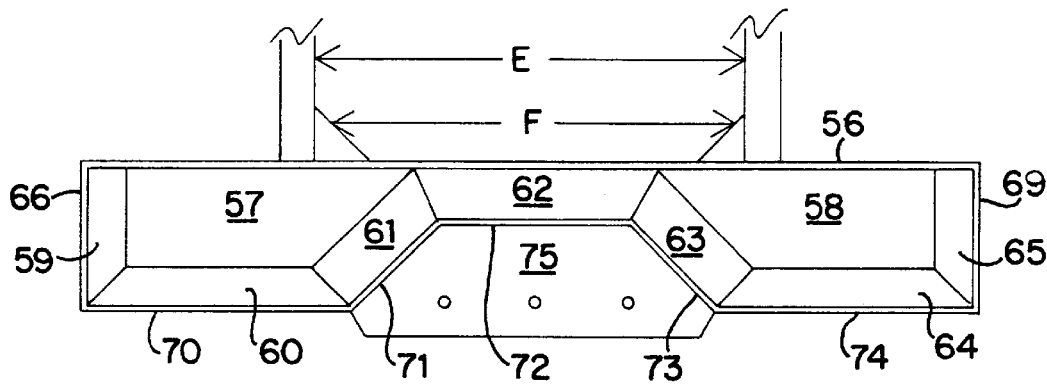
FIG. 5 shows a top view of the rear bumper without the lid, and with several mounting components.
Figure 6:
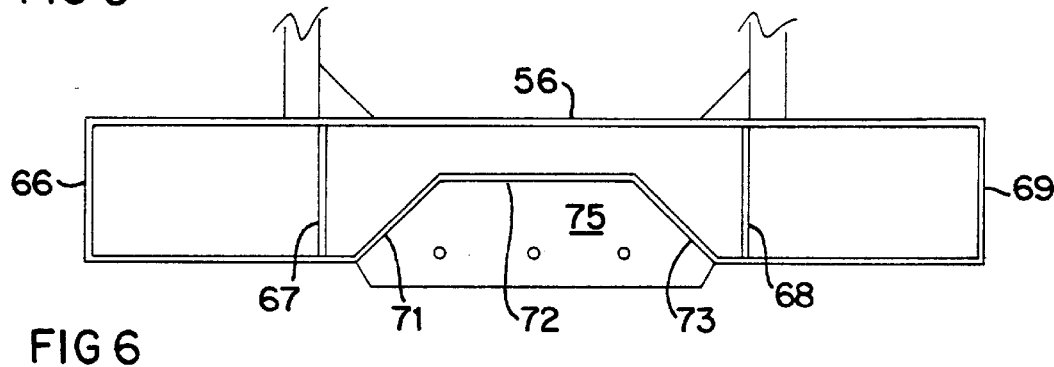
FIG. 6 shows a top view of the rear bumper of FIG. 5, and with secondary mounting components.
Figure 7:
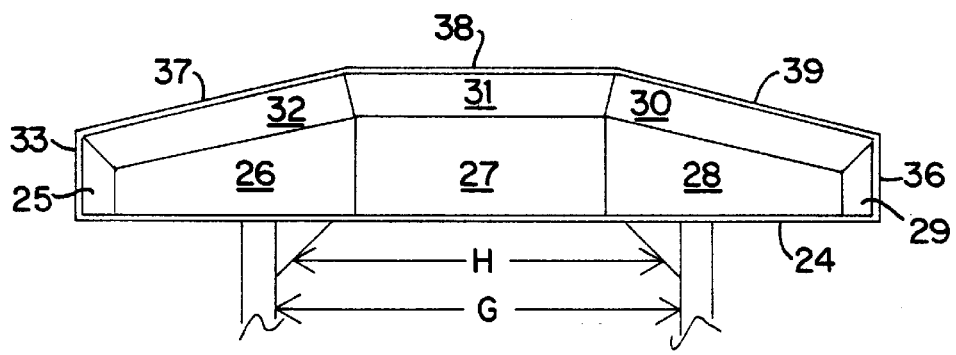
FIG. 7 shows a top view of the front bumper without the lid, and with several mounting components.
Figure 8:
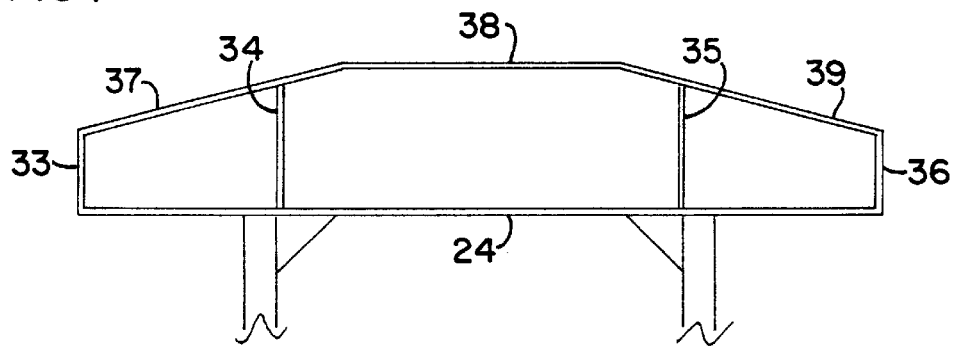
FIG. 8 shows a top view of the front bumper of FIG. 7, and with secondary mounting components.
Figure 9:
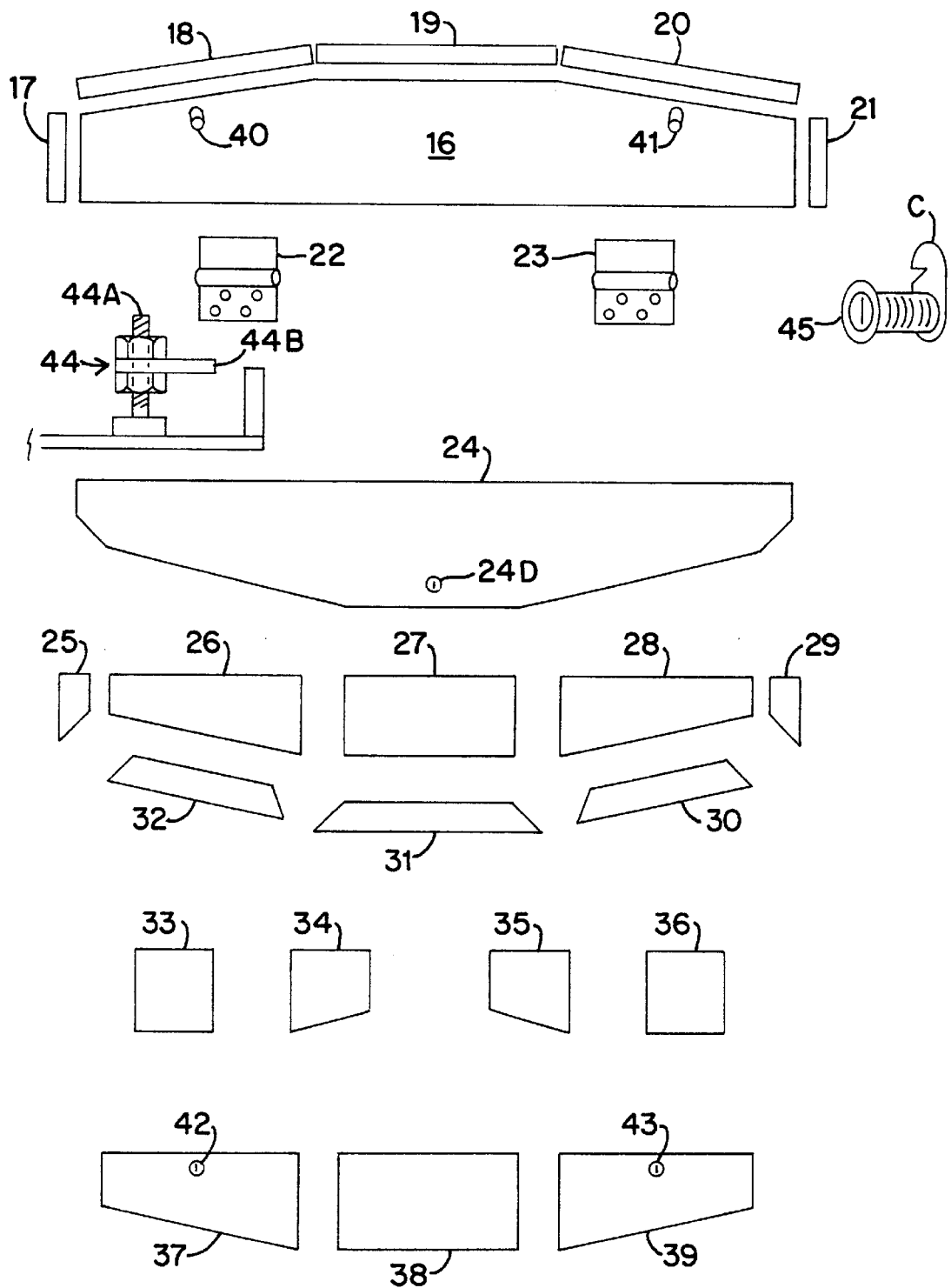
FIG. 9 shows an exploded view of the parts of the front storage bumper of the present invention.
Figure 10:
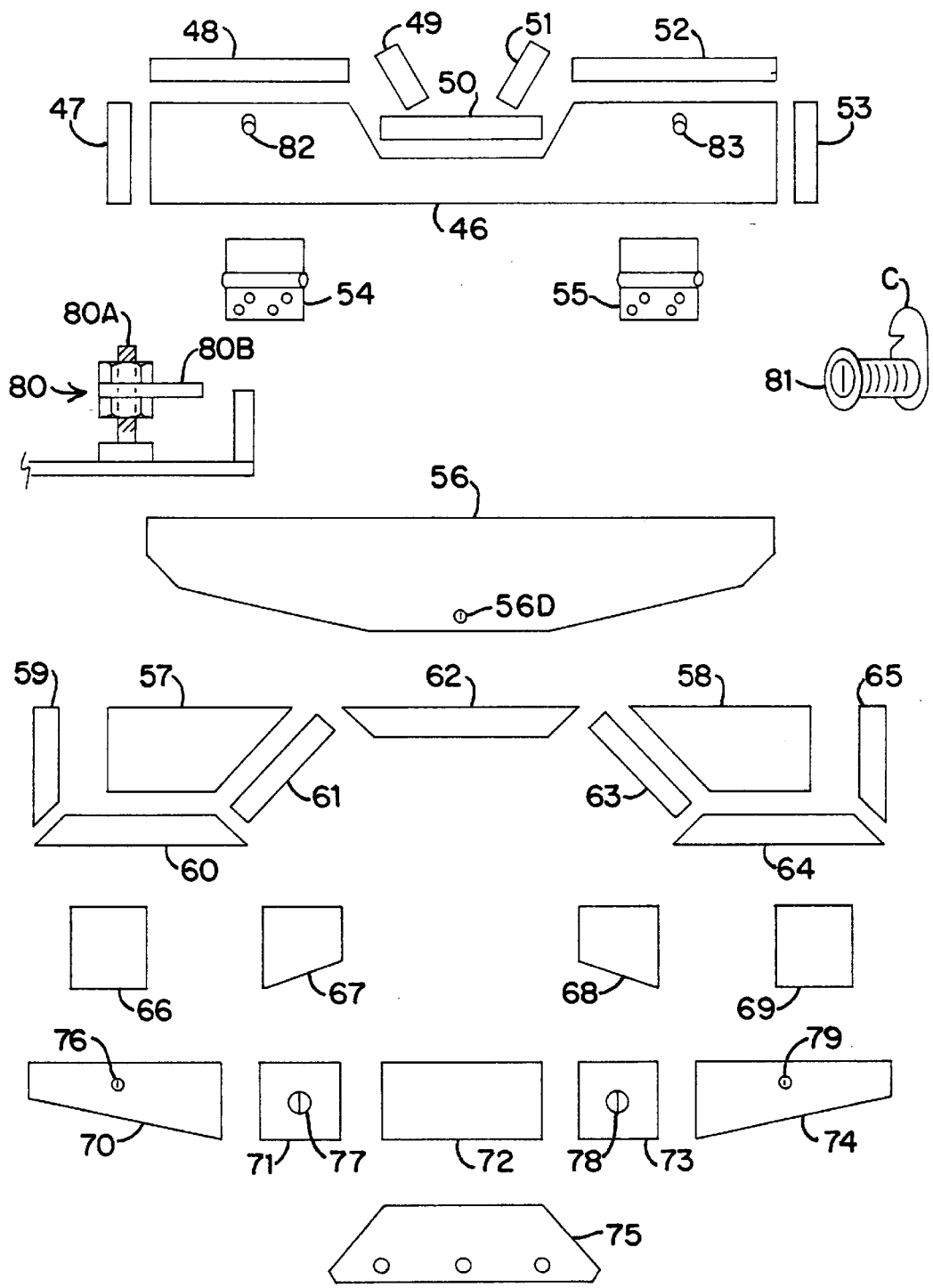
FIG. 10 shows an exploded view of the parts of the rear storage bumper of the present invention.

A vehicle bumper set of the present invention shown in FIG. 1 though 10 illustrate a pair of bumpers primarily designed to perform various tasks while still enhancing the appearance of a sport utility vehicle. A front storage bumper 100 and a rear storage bumper 200 are the major components of the present invention, wherein they may be supplied together as a set, or individually as either a front bumper alone or a rear bumper alone. Although the various components of the front bumper 100 and the second bumper 200 may be formed of any of a variety of materials, including non-metallic or metallic materials, they are preferably made of standard, commercially available steel.

In general, a tow plate 75 is preferably formed of steel with a thickness of about thickness is ⅜-inch, while the remaining plate components illustrated are approximately 3/16-inch thick. All seams are welded on the inside and the outside, forming one-hundred percent weld where all seams meet. It is important to ensure the weather resistance of the bumpers that such welding be used. All exterior seams are preferably ground to rigid, pointed, even corners, so as to form the desirable minimal bumper profile. All of the parts of each of the bumpers are preferably cut, shaped, and tacked in place in the manner noted.

With continuing reference to all of the figures, the components of the bumpers are joined in the following manner. Backs of the front bumper 100 are set with end plates 33 and 36 and tacked to plate 24. In addition, backs of the rear bumper 200 are set with end plates 66 and 69 fitted and tacked to plate 56. Bottom plates 26, 27, and 28, as well as plates 57 and 58 are then tacked together as illustrated. Front plates 37, 38, 39, 70, 71, 72, 73, and 74 are fitted and tacked. Plate components 25,29,30,31,32,59,60,61,62,63,64,65 are fitted together so as to produce an angle of about 45° inward and are tacked. All fitted seams are welded inside and outside. Center members 34,35,67,68 are fitted then welded. All outside seams are then ground to produce rigid, pointed, even corners. Rear bumper 200 only is fitted with a tow plate 75 and then is welded into place.

Assembly of the step lid begins with floor plate (diamond plate) 16 and 46. One-inch flanges or lid lips 17, 18, 19, 20, 21, as well as components 47,48, 49,50,51,52,53 are fitted and welded, then all seams outside are ground to rigid, pointed corners. Hinges 22,23,54,55 are fitted and welded to lid. Threaded studs 44A and 80A are positioned at 40,41, 82,83 and welded in place. The assembly is completed with two threaded nuts and latch tab 44B and 80B, so as to produce an adjustable lid catch latch.

Various holes are drilled to provide for coupling of components and to create the drainage holes previously noted. In particular, key lock holes 42,43,76,79, the tow plate's three holes, plate light holes 77,78, and drainage holes 24D, 56D are all drilled. Step lid hinges 22,23,54,55 are drilled and the lid is attached to back plates 24,56, preferably with nuts and bolts. A finish is applied and then plate lights 77,78 are mounted. The same key locks 45,81 are mounted in locations 42,43,76,79, all as illustrated.

Both completed bumpers 100 and 200 are mounted to the vehicle, preferably using channel iron E, G and triangle plates F, H welded to the bumpers and then bolted to the frame member of the vehicle. The noted arrangement permits the introduction of a variety of equipment usable with the vehicle into the storage compartment or compartments created in the stylized design described and shown.

It should be realized that different chassis or frame construction of different vehicles will require some modifications related to the way that the bumpers are interconnected with and attached to the vehicle. Such modifications will be obvious to those skilled in the art and can be adapted as required without substantially altering the inventive concepts herein disclosed and claimed. All such modifications, alternatives, and equivalents are deemed to be within the scope of my invention as described in the following claims.

I claim:

1. A vehicle storage bumper for application to a rear of a vehicle, said bumper comprising:

a. a first bumper section having one or more storage compartments attachable to a center rear section of a vehicle;

b. a second bumper section having one or more storage compartments, wherein said second bumper section is attachable to a first rear section of said vehicle so as to extend substantially adjacent to a first side of said vehicle, wherein said second bumper section is affixed to said first bumper section at a first side thereof, and wherein said second bumper section is deepest where it is affixed to said first bumper section and is most shallow adjacent to said first side of said vehicle;

c. a third bumper section having one or more storage compartments, wherein said third bumper section is attachable to a second rear section of said vehicle so as to extend substantially adjacent to a second side of said vehicle opposite from said first side of said vehicle, wherein said third bumper section is affixed to said first bumper section at a second side thereof opposite said first side thereof, and wherein said third bumper section is deepest where it is affixed to said first bumper section and is most shallow adjacent to said second side of said vehicle; and d. a lid couplable to one or more of said bumper sections, wherein a width of said second bumper section tapers from where it is affixed to said first bumper section toward said first side of said vehicle at an angle of approximately 45, and a width of said third bumper section tapers from where it is affixed to said first bumper section toward said second side of said vehicle at an angle of approximately 45.

2. The storage bumper as claimed in claim 1 wherein said first bumper section is designed with a step plate and license attachment means.

3. The storage bumper as claimed in claim 1 further comprising means for coupling said first bumper section, said second bumper section, and said third bumper section to said rear of said vehicle, wherein said means for coupling includes a first frame bar affixed to said second bumper section and couplable to a frame of said vehicle, and a second frame bar affixed to said third bumper section and couplable to said frame of said vehicle.

4. The storage bumper as claimed in claim 1 wherein a depth of said second bumper section extends upwardly from where it is affixed to said first bumper section toward said first side of said vehicle at an angle of approximately 35°, and a depth of said third bumper section extends upwardly from where it is affixed to said first bumper section to said second side of said vehicle at an angle of approximately 35°.

5. The storage bumper as claimed in claim 1 wherein said first bumper section includes one or more drainage holes.

6. The storage bumper as claimed in claim 1 wherein said first bumper section, said second bumper section, and said third bumper section are fabricated substantially of steel.

7. A vehicle storage bumper for application to a front of a vehicle, said bumper comprising:

a. a first bumper section having one or more storage compartments attachable to a center front section of a vehicle;

b. a second bumper section having one or more storage compartments, wherein said second bumper section is attachable to a first front section of said vehicle so as to extend substantially adjacent to a first side of said vehicle, wherein said second bumper section is affixed to said first bumper section at a first side thereof, and wherein said second bumper section is widest and deepest where it is affixed to said first bumper section and is narrowest and most shallow adjacent to said first side of said vehicle;

c. a third bumper section having one or more storage compartments, wherein said third bumper section is attachable to a second front section of said vehicle so as to extend substantially adjacent to a second side of said vehicle opposite from said first side of said vehicle, wherein said third bumper section is affixed to said first bumper section at a second side thereof opposite said first side thereof, and wherein said third bumper section is widest and deepest where it is affixed to said first bumper section and is narrowest and most shallow adjacent to said second side of said vehicle; and d. a lid couplable to one or more of said bumper sections, wherein a width of said second bumper section tapers from where it is affixed to said first bumper section toward said first side of said vehicle at an angle of approximately 45, and a width of said third bumper section tapers from where it is affixed to said first bumper section toward said second side of said vehicle at an angle of approximately 45.

8. The storage bumper as claimed in claim 7 further comprising means for coupling said first bumper section, said second bumper section, and said third bumper section to said front of said vehicle, wherein said means for coupling includes a first frame bar affixed to said second bumper section and couplable to a frame of said vehicle, and a second frame bar affixed to said third bumper section and couplable to said frame of said vehicle.

9. The storage bumper as claimed in claim 7 wherein a depth of said second bumper section extends upwardly from where it is affixed to said first bumper section toward said first side of said vehicle at an angle of approximately 35°, and a depth of said third bumper section extends upwardly from where it is affixed to said first bumper section to said second side of said vehicle at an angle of approximately 35°.

10. The storage bumper as claimed in claim 7 wherein said first bumper section includes one or more drainage holes.

\* \* \* \* \*